Jan. 14, 1930.    A. NYMAN    1,743,727
INSULATOR
Filed Sept. 7, 1926
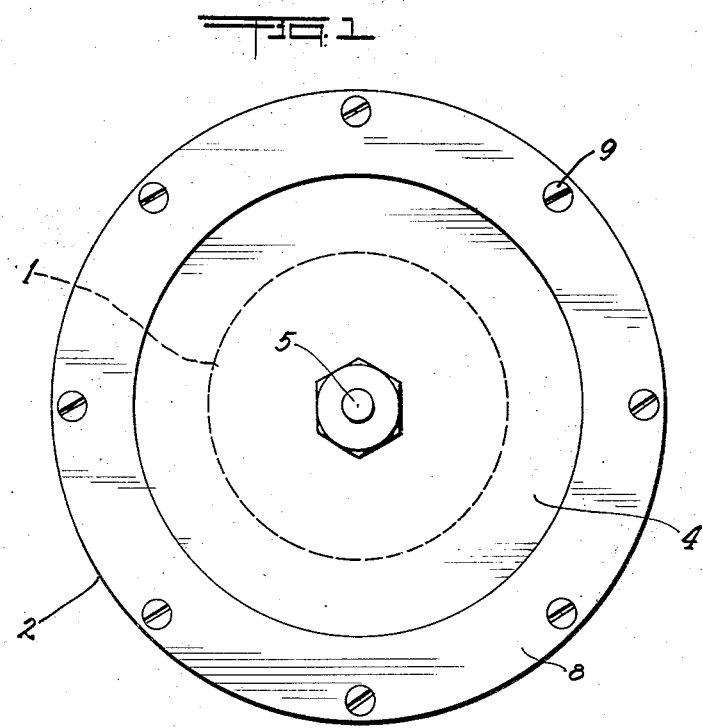
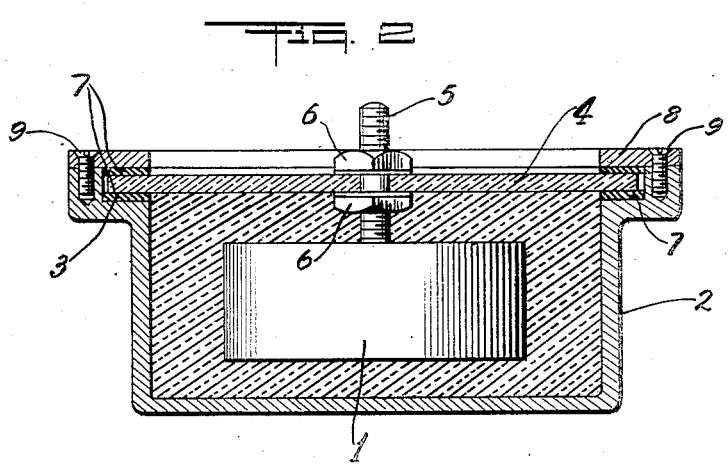
INVENTOR
ALEXANDER NYMAN
BY
William F. Nickel
ATTORNEY Patented Jan. 14, 1930

1,743,727

UNITED STATES PATENT OFFICE

ALEXANDER NYMAN, OF DOBBS FERRY, NEW YORK, ASSIGNOR TO DUBILIER CONDENSER CORPORATION, OF NEW YORK, N. Y., A CORPORATION OF DELAWARE

INSULATOR

Application filed September 7, 1926. Serial No. 133,907.

This invention relates to an improvement in electrical condensers, and particularly to condensers mounted in casings through which extends a conductor surrounded by suitable insulation.

An object of my invention is to provide a condenser in a casing with an insulating cover of superior material. My invention is fully set forth in the following description, taken with the accompanying drawings which show a preferred embodiment thereof, but changes in details may, of course, be made to the full extent permitted by the scope of the appended claim.

On the drawings:

Figure 1 is a top plan of my condenser according to my invention; and

Figure 2 is a transverse section thereof.

The same numerals identify the same parts throughout.

On the drawings, the numeral 1 indicates the body of the condenser which may be of any suitable design housed in a casing 2 of metal or other material. This casing is preferably closed at the sides and bottom, but is open at the top, where it is provided with a shoulder 3. On this shoulder rests an insulating cover 4, and through an aperture in the middle of the cover passes a conductor or terminal in the form of a stem 5, which is preferably threaded and is held in place by nuts 6, gripping the upper and lower face of the cover 4, these nuts being screwed on the stem 5 and having washers interposed between them and the surface of the cover 4, if necessary. The condenser may have any desired shape, and so may the casing 2, and the body of the condenser may be embedded in wax or any other suitable insulation, filling the inside of the casing. One terminal of the condenser may be joined to the casing, and the other terminal, which will of course be a high tension terminal, will be united to the stem 5 so that connection can be made with the condenser to the operating circuit.

On the shoulder 3 I may lay a gasket 7 to engage the lower face of the cover 4 around its periphery; and a similar gasket 7 may be laid on the top of this cover, and a retaining ring 8 held by screws 9 securing the cover and gaskets in place, and sealing up the condenser in the casing 2. I prefer to make the cover 4 of Isolantite or Pyrex glasses, which are silicate compounds having low dielectric losses. These glasses are much superior to well known insulating substances such as ordinary high grade porcelain and are particularly suited for condenser construction. For example, the dielectric losses of high grade porcelain is ten times greater than such losses in the silicate compounds mentioned.

The cover 4 is preferably flat, for ease of manufacture and avoidance of losses.

Having described my invention, what I believe to be new and desire to secure and protect by Letters Patent of the United States is:—

The combination of a metallic casing having integral outwardly extending flanges at an open end thereof, a condenser within said casing, said condenser having a terminal comprising a central supporting stud, a flat cover for said casing supported upon and positioned by the integral flange of the casing, and having an opening through which the supporting stud of the condenser may project and be supported thereby, a clamping member for said cover, a gasket member disposed on either side of the cover at the periphery thereof, the said cover comprising a silicate compound having a low dielectric loss.

In testimony whereof I affix my signature.

ALEXANDER NYMAN.